United States Patent
Ide

(10) Patent No.: US 9,647,772 B2
(45) Date of Patent: May 9, 2017

(54) SIGNAL DECISION CIRCUIT, OPTICAL RECEIVER, AND SIGNAL DECISION METHOD

(71) Applicant: FUJITSU LIMITED, Kawasaki-shi, Kanagawa (JP)

(72) Inventor: Satoshi Ide, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/080,970

(22) Filed: Mar. 25, 2016

(65) Prior Publication Data

US 2016/0301480 A1    Oct. 13, 2016

(30) Foreign Application Priority Data

Apr. 13, 2015    (JP) ................... 2015-081766

(51) Int. Cl.
| | | |
|---|---|---|
| H04B 10/69 | (2013.01) | |
| H04B 10/80 | (2013.01) | |
| H04L 25/06 | (2006.01) | |
| H04L 27/06 | (2006.01) | |

(52) U.S. Cl.
CPC ......... *H04B 10/801* (2013.01); *H04B 10/695* (2013.01); *H04L 25/062* (2013.01); *H04L 27/06* (2013.01)

(58) Field of Classification Search
CPC ... H04B 10/801; H04B 10/695; H04L 25/062; H04L 27/06
USPC .......................................................... 398/115
See application file for complete search history.

(56) References Cited

U.S. PATENT DOCUMENTS

| | | | | |
|---|---|---|---|---|
| 6,907,202 B1* | 6/2005 | Ide | ........................ | H03G 3/3084 398/208 |
| 7,218,865 B2* | 5/2007 | Doh | ....................... | H04L 25/062 250/214 A |
| 2002/0153958 A1* | 10/2002 | Ide | .......................... | H03F 3/087 330/308 |
| 2003/0229461 A1* | 12/2003 | Fujisaku | ............... | H04L 25/062 702/66 |
| 2007/0098416 A1* | 5/2007 | Nogami | ............... | H03G 3/3084 398/208 |
| 2008/0031638 A1* | 2/2008 | Nakamoto | ........... | H04B 10/693 398/202 |

(Continued)

FOREIGN PATENT DOCUMENTS

| | | |
|---|---|---|
| JP | 62-007227 | 1/1987 |
| JP | 08-237314 | 9/1996 |
| JP | 2007-194967 | 8/2007 |

*Primary Examiner* — Dalzid Singh
(74) *Attorney, Agent, or Firm* — Fujitsu Patent Center

(57) ABSTRACT

A signal decision circuit includes: a first decision circuit configured to identify a voltage level of an input signal using an average level of an amplitude of the input signal as a first threshold level; a detection circuit configured to detect an average of an amplitude absolute level based on the average level of the amplitude; a second decision circuit configured to identify a voltage level of the input signal using a second threshold level obtained by adding the average of the amplitude absolute level to the average level of the amplitude; and a third decision circuit configured to identify a voltage level of the input signal using a third threshold level obtained by subtracting the average of the amplitude absolute level from the average level of the amplitude.

20 Claims, 17 Drawing Sheets

(56) References Cited

U.S. PATENT DOCUMENTS

2010/0067924 A1\* 3/2010 Noda .................. H03G 3/3084
398/202

\* cited by examiner

SR=SYMBOL RATE

SR:SYMBOL RATE

SIGNAL DECISION CIRCUIT, OPTICAL RECEIVER, AND SIGNAL DECISION METHOD

CROSS-REFERENCE TO RELATED APPLICATION

This application is based upon and claims the benefit of priority of the prior Japanese Patent Application No. 2015-081766, filed on Apr. 13, 2015, the entire contents of which are incorporated herein by reference.

FIELD

The embodiment disclosed herein relates to a signal decision circuit, an optical receiver, and a signal decision method.

BACKGROUND

Together with improvement in speed and increase in capacity of signal transmission between central processing units (CPUs) in a high-end server, a supercomputer or the like, breaking down of the limit to electric signal transmission is demanded.

Related arts are disclosed in Japanese Laid-open Patent Publication No. 2007-194967, Japanese Laid-open Patent Publication No. 62-7227 or Japanese Laid-open Patent Publication No. 08-237314.

SUMMARY

According to an aspect of the embodiment, a signal decision circuit includes: a first decision circuit configured to identify a voltage level of an input signal using an average level of an amplitude of the input signal as a first threshold level; a detection circuit configured to detect an average of an amplitude absolute level based on the average level of the amplitude; a second decision circuit configured to identify a voltage level of the input signal using a second threshold level obtained by adding the average of the amplitude absolute level to the average level of the amplitude; and a third decision circuit configured to identify a voltage level of the input signal using a third threshold level obtained by subtracting the average of the amplitude absolute level from the average level of the amplitude.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1A:
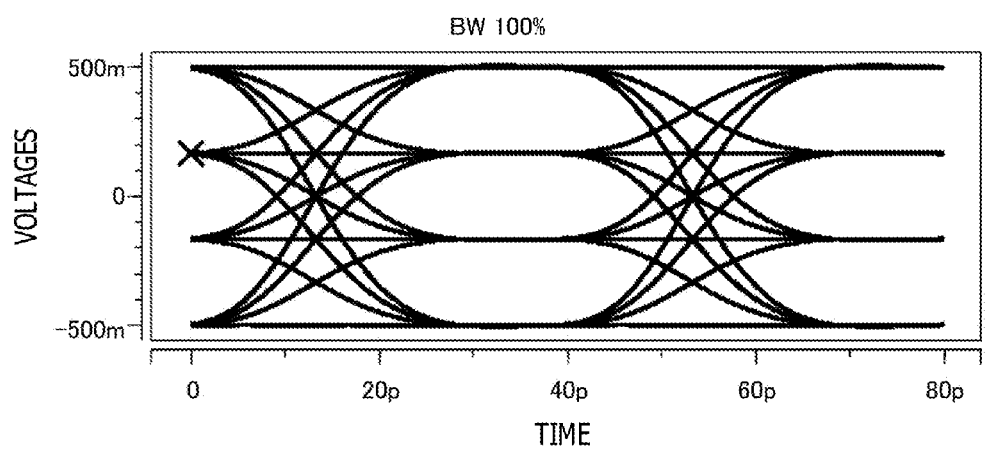
FIGS. 1A and 1B depict an example of a variation of a signal waveform by a bandwidth variation of an input signal.

An optical interconnect that uses a technology for high-speed optical transmission may be applied, for example, to short-distance or middle-distance inter-CPU signal transmission. The optical interconnect includes an optical transceiver or a like device that converts an electric signal into an optical signal, and data are transmitted by the optical signal between optical devices at the transmitter side and the receiver side through a transmission line such as, for example, an array optical fiber. For an optical transmission unit for optical transmitter, for example, a vertical cavity surface emitting laser (VCSEL) of a small size is used which can perform direct current modulation with low power consumption. For an optical receiver unit, for example, a photo diode (PD) is used which receives an optical signal and converts the optical signal into an electric signal. For the signal speed, high-speed optical transmission of, for example, 25 Gb/second may be demanded in order to satisfy the demand for broadband signal transmission between CPUs.

Toward further improvement in speed of signal transmission, a multi-level modulation technology may be adopted. For example, in pulse amplitude modulation (PAM), the voltage level of a signal is modulated into four stages, eight stages or the like such that data of 2 bits, 3 bits or the like is transmitted by one pulse. At the receiver side, demodulation is performed by detecting the amplitude of the received signal every symbol period.

In optical transmission, the signal level is varied by the loss on a transmission line such as an optical fiber, and the range between the maximum power and the minimum power is 10 times to 100 times. At the receiver side, the optical signal is identified in a wide dynamic range corresponding to the signal level variation.

As a technology for eliminating the variation of the optical power, for example, an analog process based on an automatic gain control (AGC) circuit and a digital process based on a combination of an analog/digital converter (ADC) and a digital signal processor (DSP) may be adopted.

When the variation of the optical power is eliminated, it is desired to achieve both of high speed processing and low power consumption. However, since the AGC uses high-speed negative feedback, the AGC may have a limit to increase of the speed of the circuitry. The level detection by an ADC and a DSP involves high power consumption, and also the latency may be increased by a digital processing.

In the multi-level modulation, optimum threshold levels for a plurality of eye patterns may be set in order to identify a signal. For example, the optimum threshold level for each eye changes depending upon the loss or bandwidth degradation in the optical transmission line. An AGC or a combination of an ADC and a DSP for keeping the output fixed irrespective of the variation of the input signal waveform may have a limit in regard to the processing speed or the power consumption. Therefore, a technology for identifying a multi-level amplitude modulation signal with a high degree of accuracy using a simple and easy configuration may be provided.

Figure 1B:
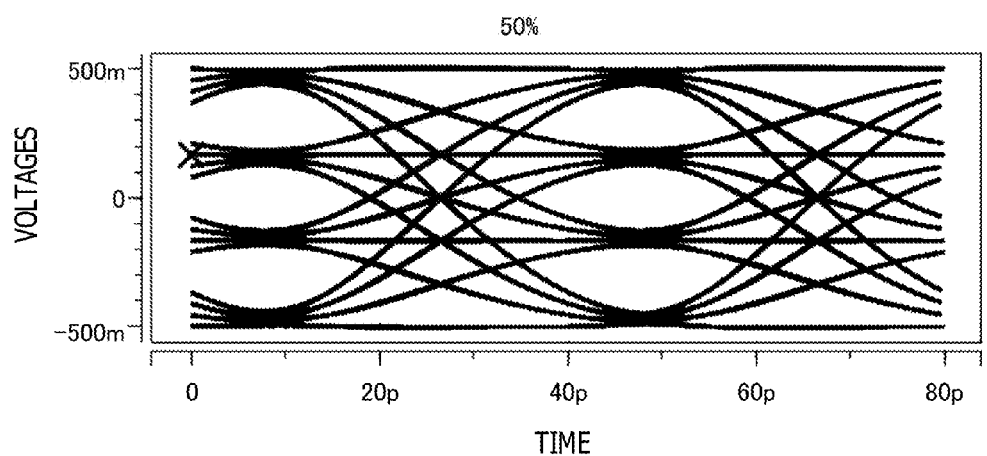

FIGS. 1A and 1B depict an example of a variation of a signal waveform by a bandwidth variation of an input signal. In FIGS. 1A and 1B, variations of each eye pattern that relies upon a bandwidth of an input signal are depicted. In the case where the frequency bandwidth of an input signal is wide as depicted in FIG. 1A, the variation of a four-level pulse amplitude modulation (suitably referred to as "PAM4") waveform is small and the eye openings are clear. In the case where the frequency bandwidth is narrow as depicted in FIG. 1B, the eye openings are reduced by an amplitude variation of a PAM4 waveform. The long transmission in an optical transmission line has an influence on the optical loss or the reduction of the bandwidth, and the eye openings become small. Where the eye openings become small, threshold levels optimum to an upper side eye and a lower side eye approach the center side. For example, by automatically setting the optimum threshold levels following up the variation of the signal amplitude, a multi-level amplitude modulation signal is identified appropriately.

Figure 2:
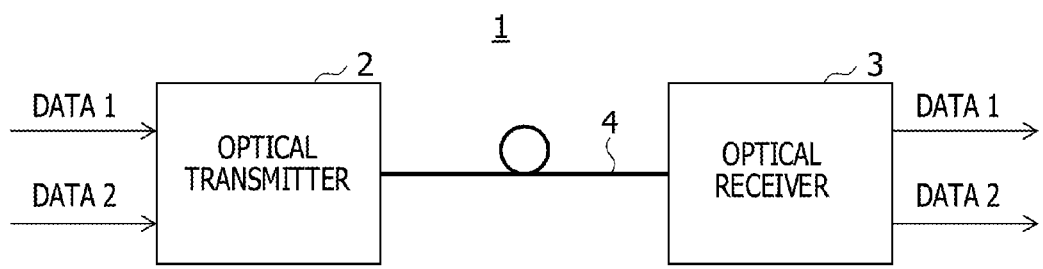
FIG. 2 depicts an example of an optical transmission system.

FIG. 2 depicts an example of an optical transmission system. A multi-level modulation optical transmission system 1 depicted in FIG. 2 includes an optical receiver 3 to which a signal decision circuit is applied. The multi-level modulation optical transmission system 1 includes an optical transmitter 2, the optical receiver 3, and an optical transmission line 4. To the optical transmitter 2, data 1 and data 2 are input, for example, from a signal processer. The data 1 may be data, for example, of an upper bit, and the data 2 may be data of a lower bit. The optical transmitter 2 generates an optical signal having amplitude levels of four levels corresponding to data of 2 bits and sends out the optical signal into the optical transmission line 4. The optical receiver 3 identifies the signal level of the optical signal received from the optical transmission line 4 to demodulated data of 2 bits.

As described hereinabove, the signal amplitude of a multi-level modulation optical signal varies depending upon the loss or the bandwidth degradation in the optical transmission line 4. Since the average of the amplitude absolute level of an input signal follows up the variation of the amplitude center of an eye opening, a threshold level optimum for signal distinction may be set to each eye. By setting an optimum threshold level that follows up the variation of the signal amplitude caused by the bandwidth degradation or the like based on the average of the amplitude absolute level of the input signal, the optical receiver 3 may identify a multi-level amplitude modulation signal with a high degree of accuracy.

Figure 3:
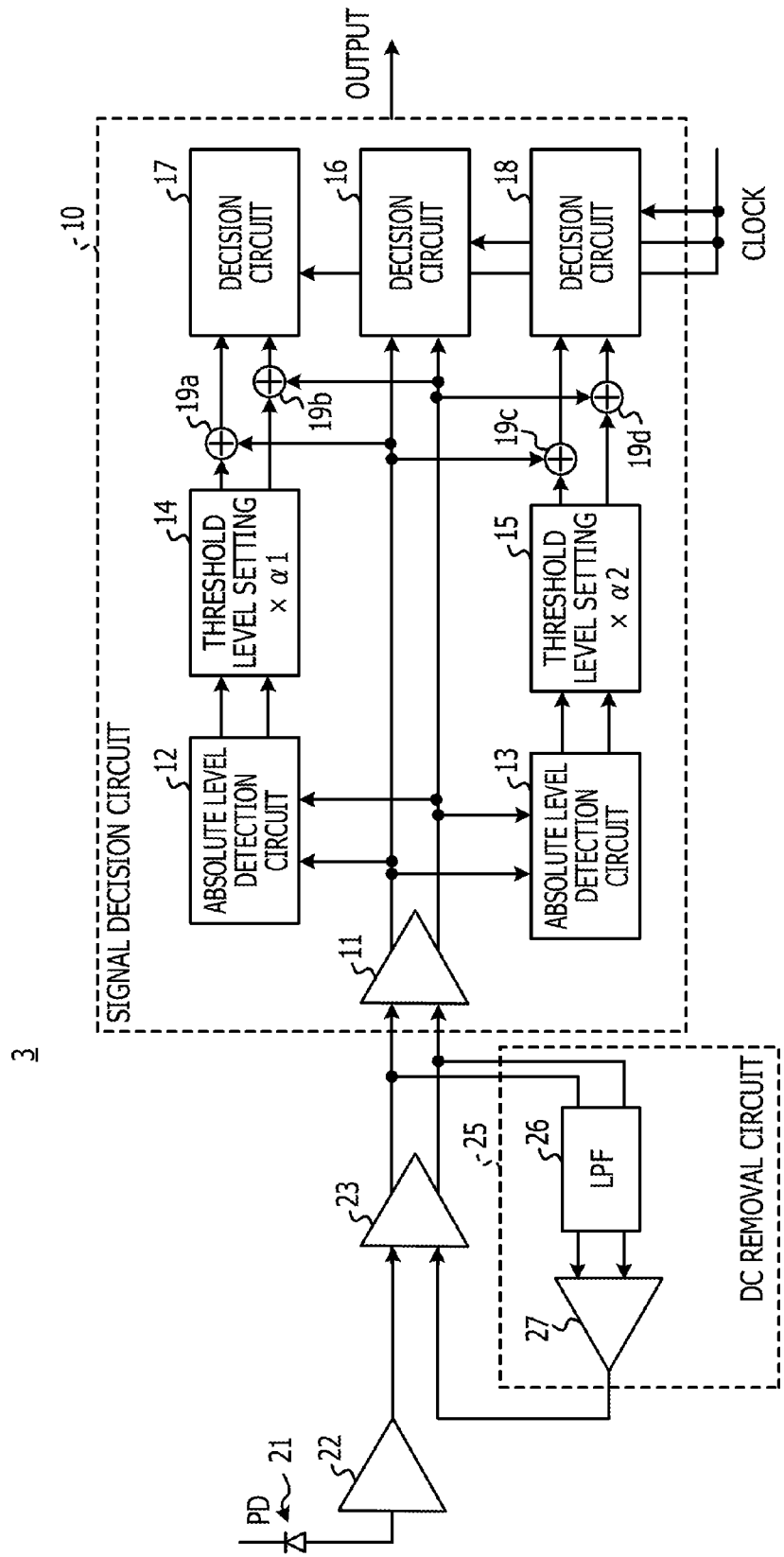
FIG. 3 depicts an example of an optical receiver.

FIG. 3 depicts an example of an optical receiver. As an example, the optical receiver 3 receives a multi-level modulation optical signal modulated into four amplitude levels (voltage levels). The optical receiver 3 includes a PD 21 as an optical receiver element, a transimpedance amplifier (TIA) 22, a linear amplifier 23, a direct-current (DC) removal circuit 25 and a signal decision circuit 10. The PD 21 outputs light received thereby as electric current. The TIA 22 converts the current into a voltage. The output of the TIA 22 is coupled to the positive input of the linear amplifier 23.

The voltage input to the linear amplifier 23 includes a mixture of an alternating-current (AC) component and a DC component. Therefore, the DC removal circuit 25 removes the DC component from the input signal. A low-pass filter (LPF) 26 of the DC removal circuit 25 extracts only frequency components lower than the cutoff frequency from within the output of the linear amplifier 23. A DC feedback amplifier 27 feeds back the extracted low frequency components to the negative input of the linear amplifier 23. The linear amplifier 23 is a differential amplifier and amplifies the difference between the positive input and the negative input. In optical transmission, the mark ratio (ratio at which the logic "1" occupies in a signal) may be 1/2, and the average level of the signal level may be equal to 1/2 the signal amplitude. By the DC feedback, the differential output of the linear amplifier 23 is stabilized when the average level of the differential signal is at the zero level. Therefore, in the differential output of the linear amplifier 23, the zero level of the differential signal becomes the center of the signal amplitude (eye center). The DC component included in the input signal is cancelled, and only a high frequency (AC) component is amplified and output. The output of the linear amplifier 23 is a differential output, and AC signals of the opposite phases to each other are supplied to the signal decision circuit 10.

The signal decision circuit 10 includes a buffer amplifier 11, absolute level detection circuits 12 and 13, threshold level setting circuits 14 and 15, decision circuits 16, 17 and 18 and adders 19a to 19d. The buffer amplifier 11 is a differential output amplifier that fetches outputs of the linear amplifier 23 and outputs a difference. The average level of the differential output of the buffer amplifier 11, for example, of the amplitude of the input signal, is used as a first threshold level for signal decision by the decision circuit 16. The first threshold level is a threshold level corresponding to the amplitude center of an eye opening at the center. The decision circuit 16 uses the first threshold level at a timing of a clock signal to identify the voltage level of the upper bit of the input signal.

The absolute level detection circuit 12 detects a first amplitude absolute level from an output of the buffer amplifier 11 and outputs the average of the first amplitude absolute level. The amplitude absolute level may be an amplitude waveform obtained, for example, by full-wave rectification and corresponds to a signal waveform when the negative side of the signal amplitude is folded back to the positive side with respect to an average level of the amplitude of the input signal, for example, with respect to the zero level. The average of the amplitude absolute level follows up the amplitude variation of the input signal caused by the bandwidth degradation or the optical loss. The threshold level setting circuit 14 sets a second threshold level for signal decision based on the output of the absolute level detection circuit 12, for example, based on the average of the first amplitude absolute level. A level obtained by fixedly multiplying the output of the absolute level detection circuit 12, for example, the average of the first amplitude absolute level by a given ratio α1 may be set as the second threshold level. The second threshold level is added to the differential output of the buffer amplifier 11 by the adders 19a and 19b and input to the decision circuit 17. Where the differential output exhibits an ideal state of the difference equal to zero, the second threshold level may be used as it is by the decision circuit 17. The second threshold level is a threshold level corresponding to the amplitude center of the uppermost eye opening. The decision circuit 17 uses the second threshold level at a timing of the clock signal to identify the voltage level of the lower bit of the input signal.

The absolute level detection circuit 13 detects a second amplitude absolute level from an output of the buffer amplifier 11 and outputs the average of the second amplitude absolute level. The threshold level setting circuit 15 sets a third threshold level for signal decision based on the output of the absolute level detection circuit 13, for example, the average of the second amplitude absolute level. The third threshold level is set following up the variation of the transmission signal similarly to the second threshold level. The third threshold level is set by fixedly multiplying the output of the absolute level detection circuit 13, for example, the average of the second amplitude absolute level by a given ratio α2. The third threshold level is added to the differential output of the buffer amplifier 11, for example, to the average level of the signal amplitude, by the adders 19c and 19d and input to the decision circuit 18. By setting the given ratio α2 as a negative level, a same effect as that where the third threshold level is subtracted from the average level of the amplitude is obtained. Where the differential output of the buffer amplifier 11 exhibits an ideal state of the difference equal to zero, the third threshold level may be used as it is by the decision circuit 18. The third threshold level is a threshold level corresponding to the amplitude center of the lowermost eye opening. The decision circuit 18 uses the third threshold level at a timing of the clock signal to identify the voltage level of the lower bit of the input signal.

In FIG. 3, a case is depicted in which, assuming that the mark ratio is 1/2, the time average of the differential output of the buffer amplifier 11 is zero. For example, since an ideal state of the difference equal to zero may not be demonstrated because of an offset or the like of the differential amplifier, a correction circuit for correcting the average level of the amplitude to zero may be inserted to the preceding stage or the succeeding stage to the buffer amplifier 11.

Although the two absolute level detection circuits 12 and 13 are used in FIG. 3, alternatively the single absolute level detection circuit 12 (or 13) may output an average of the amplitude absolute level to both of the threshold level setting circuits 14 and 15. For example, the different ratios α1 and α2 may be set by the single threshold level setting circuit 14 (or 15) such that the second threshold level and the third threshold level are generated from the average of the amplitude absolute level.

Figure 4:
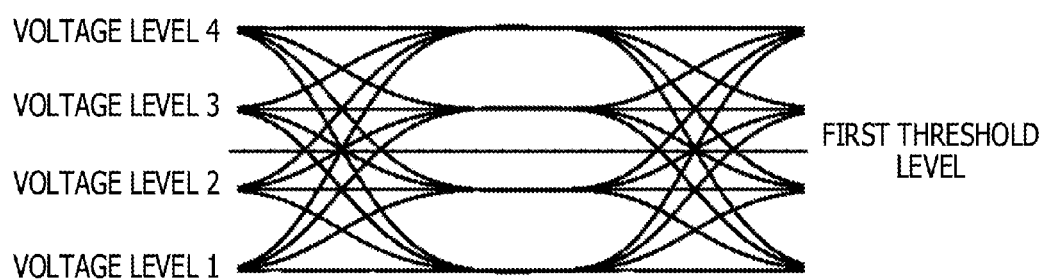
FIG. 4 depicts an example of voltage level decision using a first threshold level.

FIG. 4 depicts an example of voltage level decision using the first threshold level. In FIG. 4, threshold level decision by the decision circuit 16 is depicted. Where the input signal is higher than the first threshold level, it is decided that the voltage level is a voltage level 3 or another voltage level 4, and the upper bit 1 is identified thereby. Where the input signal is lower than the first threshold level, it is decided that the voltage level is a voltage level 1 or another voltage level 2, and the upper bit 0 is identified thereby.

Figure 5:
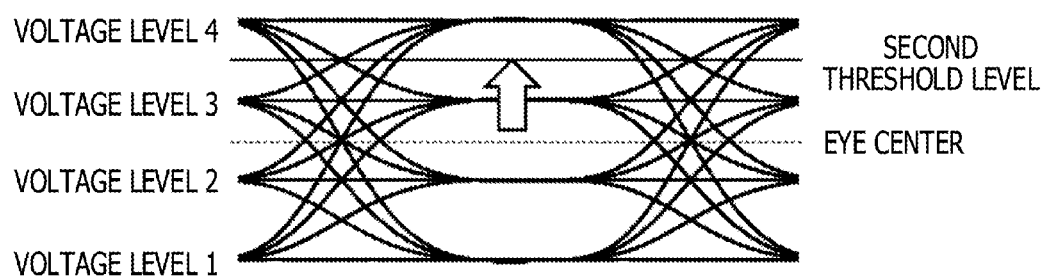
FIG. 5 depicts an example of voltage level decision using a second threshold level.

FIG. 5 depicts an example of voltage level decision using the second threshold level. In FIG. 5, threshold level decision by the decision circuit 17 is depicted. The second threshold level is a level shifted by a level equal to the second threshold level to the positive side from the eye center. When the input signal is higher than the second threshold level, it is decided that the voltage level is the voltage level 4, but when the input signal is lower than the second threshold level, it is decided that the voltage level is one of the voltage levels 1, 2 and 3.

Figure 6:
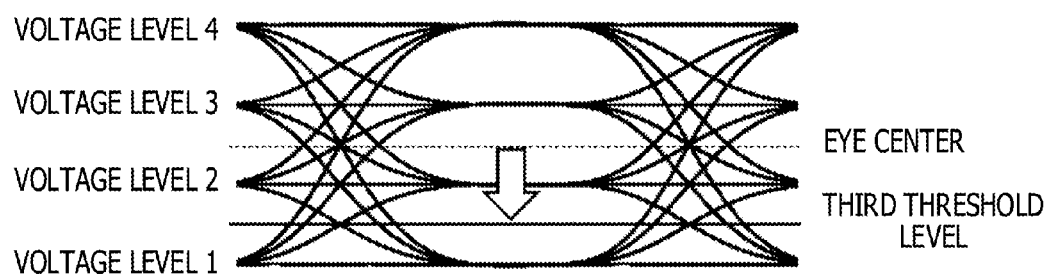
FIG. 6 depicts an example of voltage level decision using a third threshold level.
Figure 7A:
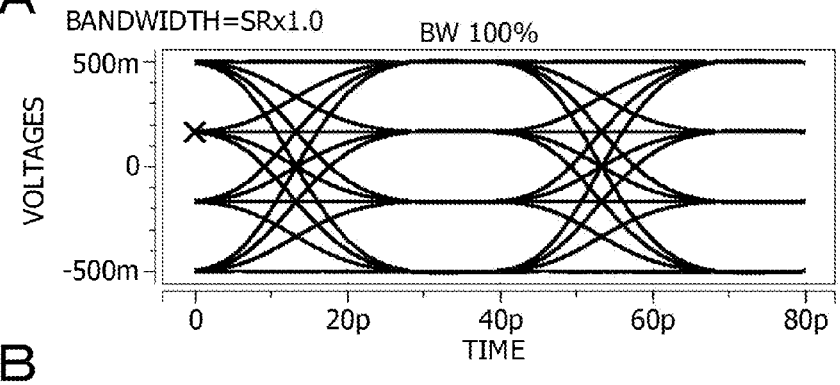
FIGS. 7A to 7D depict an example of a variation of an eye pattern caused by a bandwidth variation of an input signal.
Figure 7B:
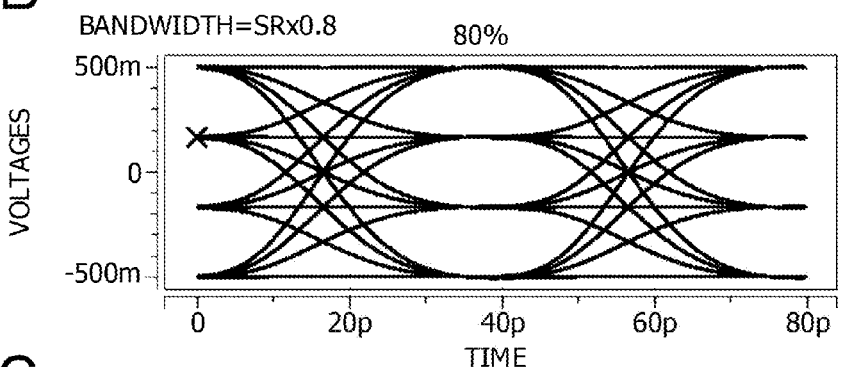
Figure 7C:
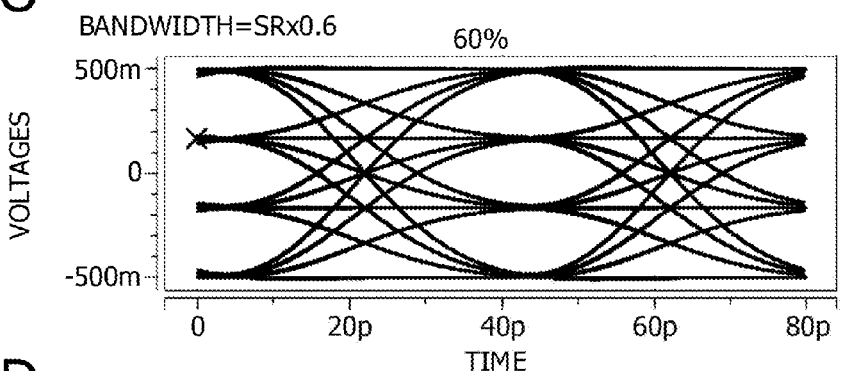
Figure 7D:
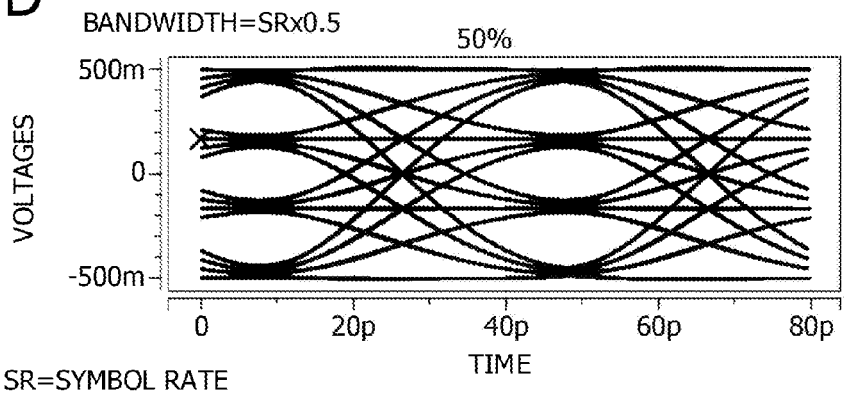

FIG. 6 depicts an example of voltage level decision using the third threshold level. In FIG. 6, threshold level decision by the decision circuit 18 is depicted. The third threshold level is a level shifted to the negative side from the eye center. Where the input signal is lower than the third threshold level, it is decided that the voltage level is the voltage level 1, but where the input signal is higher than the third threshold level, it is decided that the voltage level is one of the voltage levels 2, 3 and 4.

For example, where the 2-bit logic includes (00), (01), (11) and (10), a result of AND operation between the decision circuit 17 and the decision circuit 18 becomes an decision level for the lower bit. For example, if the input signal is higher than the third threshold level and lower than the second threshold level, then the lower bit 1 is identified, but where the input signal is higher than the second threshold level or lower than the third threshold level, the lower bit 0 is identified. Therefore, one of the data (00), (01), (11) and (10) is decided from the output of the signal decision circuit 10. The decision circuits 16, 17 and 18 may be formed using a flip-flop circuit. For example, the 2-bit logic of (00), (01), (10) and (11) may be used.

FIGS. 7A to 7D depict an example of a variation of an eye pattern caused by a bandwidth variation of an input signal. In FIGS. 7A to 7D, a variation of the opening area of an eye pattern caused by a variation of the bandwidth is depicted. Since the bandwidth is correlated with the symbol rate (SR), in FIGS. 7A to 7D, a variation of the bandwidth is indicated by a ratio to the SR. As depicted in FIGS. 7A to 7D, as the bandwidth decreases to 1.0 time, 0.8 times, 0.6 times and 0.5 times the SR, the interference between adjacent pulses increases and the area of the eye openings decreases. The threshold level for the central eye opening is the zero voltage that is the center of the eye pattern. The amplitude centers of the uppermost eye opening and the lowermost eye opening approach the center as the area decreases.

Figure 8:
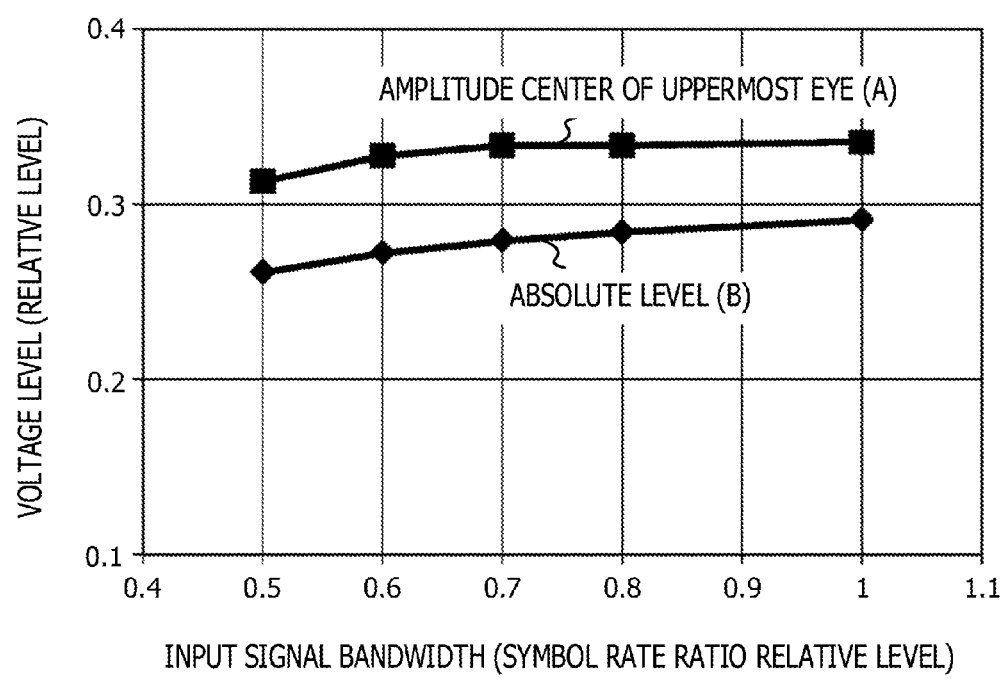
FIG. 8 depicts an example of an average of an amplitude absolute level.

FIG. 8 depicts an example of an average of an amplitude absolute level. In FIG. 8, an average of the amplitude absolute level that varies following up the variation of the amplitude center of the uppermost eye is depicted. In FIG. 8, the voltage level (line A) of the amplitude center of the uppermost eye opening and the voltage level (line B) detected in absolute level are indicated as functions of the input signal bandwidth. The input signal bandwidth is represented in a ratio to the SR similarly as in FIGS. 7A to 7D. The absolute level detection level of the line B is an average level of the amplitude absolute level by the absolute level detection circuit 12 (or 13). As depicted in FIG. 8, the amplitude absolute level varies following up the variation of the center voltage of the eye opening, for example, the variation of the optimum threshold level. Therefore, by adjusting the amplitude absolute level by a given ratio, an optimum threshold level for the eye opening is set. For example, the amplitude absolute level multiplied by A/B may be set as the optimum threshold level for the eye opening.

Before the optical receiver 3 is practically used, a correlation between the amplitude center of the uppermost eye opening or the lowermost eye opening and the average of the amplitude absolute level may be acquired in advance using the input signal bandwidth as a parameter. By setting the ratio A/B for adjustment determined from the acquired correlation coefficient to the threshold level setting circuit 14, even if the amplitude of the input signal varies while the optical receiver 3 is actually used, optimum threshold levels for signal decision are automatically set following up the variation. The ratio for threshold level adjustment for the uppermost eye opening and the ratio for threshold level adjustment for the lowermost eye opening may be calculated and set separately from each other, or an adjustment ratio of a positive level and another adjustment ratio of a negative level may be set using a correlation coefficient of one of the eye openings.

Figure 9A:
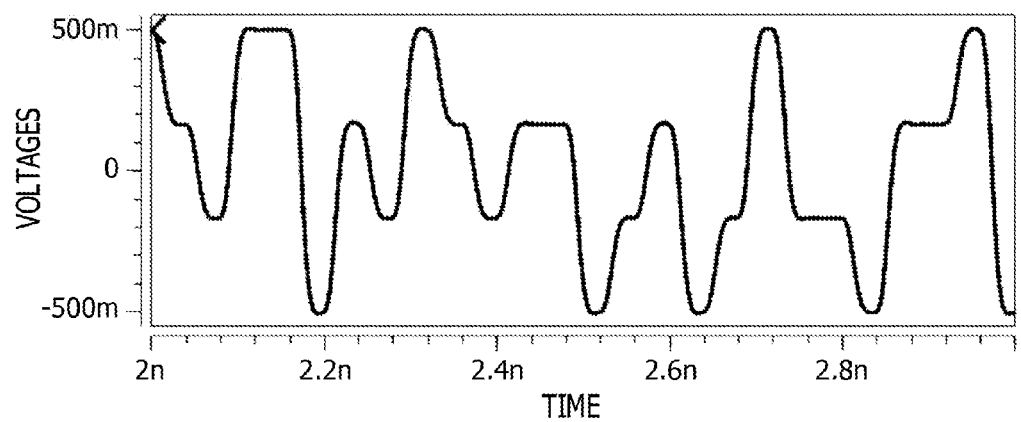
FIGS. 9A and 9B depict an example of a waveform of a four-level pulse amplitude modulation signal.
Figure 9B:
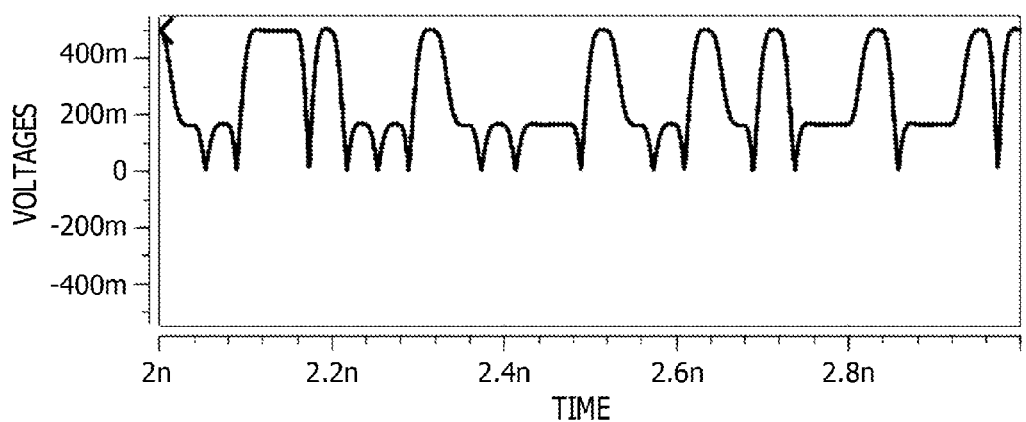
Figure 10A:
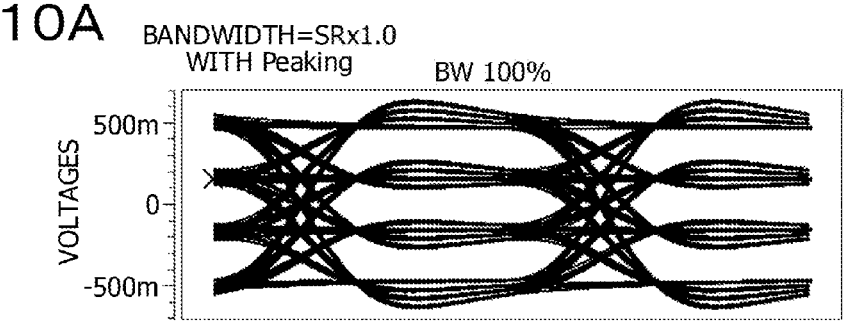
FIGS. 10A to 10D depict an example of a variation of an eye pattern caused by a bandwidth variation of an input signal where peaking occurs.
Figure 10B:
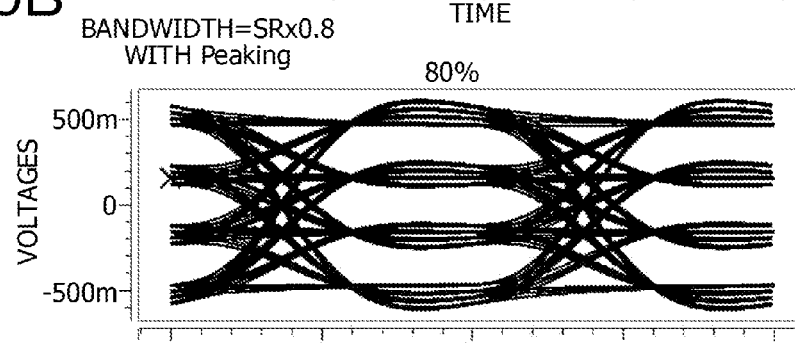
Figure 10C:
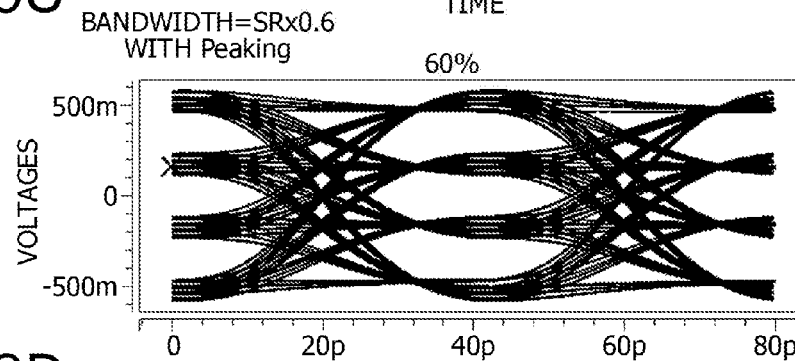
Figure 10D:
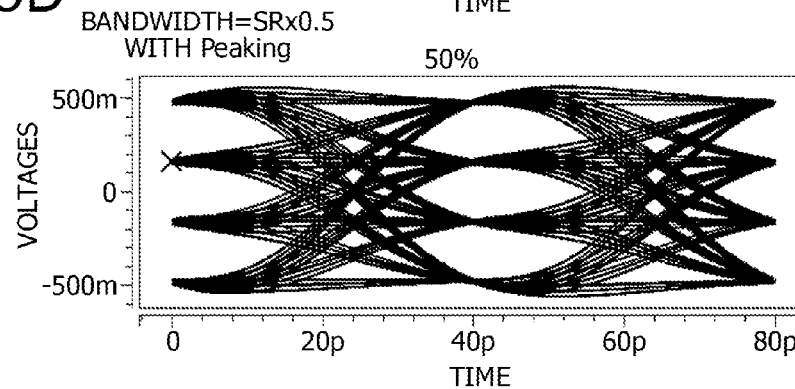

FIGS. 9A and 9B depict an example of a waveform of a four-level pulse amplitude modulation signal. FIG. 9A depicts an input waveform of a four-level pulse amplitude modulation (PAM4) signal, and FIG. 9B depicts an absolute level of the four-level pulse amplitude modulation (PAM4) signal. The average level of the PAM4 waveform of FIG. 9A is almost 0 V. The absolute level waveform of FIG. 9B corresponds to a result of full-wave rectification of the PAM4 waveform. The average of the absolute level waveform follows up the variation of the amplitude of the PAM4 waveform by an influence of bandwidth degradation or loss.

FIGS. 10A to 10D depict an example of a variation of an eye pattern caused by a bandwidth variation of an input signal where peaking occurs. In FIGS. 10A to 10D, a variation of the opening area of an eye pattern by a variation of the bandwidth is depicted similarly as in FIGS. 7A to 7D. It is a difference from the variation in FIGS. 7A to 7D that peaking occurs. If peaking occurs, the distortion to each eye opening increases, which may make setting of an optimum threshold level more difficult. However, by using the technique described above, an optimum threshold level may be set for each eye.

Figure 11:
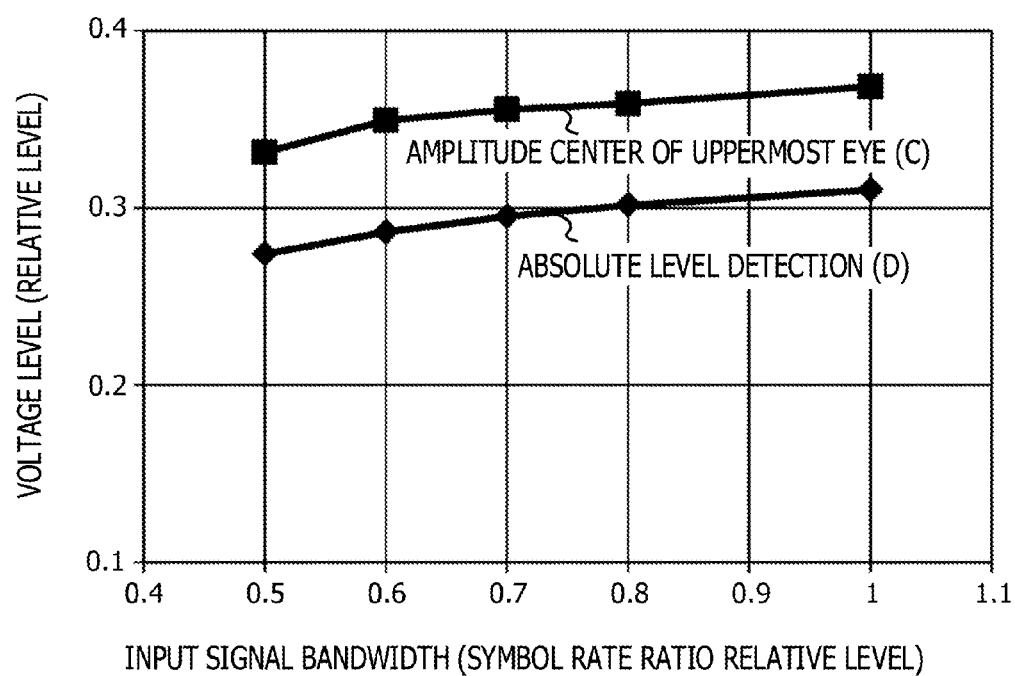
FIG. 11 depicts an example of an average of an amplitude absolute level that follows up a variation of an amplitude center of an uppermost eye in a state in which peaking occurs.

FIG. 11 depicts an example of an average of an amplitude absolute level that follows up a variation of an amplitude center of an uppermost eye in a state in which peaking occurs. In FIG. 11, the amplitude center (line C) of the uppermost eye in response to the bandwidth variation of FIGS. 10A to 10D and the average (line D) of the amplitude absolute level are depicted. The average of the amplitude absolute level may correspond to the output of the absolute level detection circuits 12 and 13 of FIG. 3. As depicted in FIG. 11, even where peaking occurs, the average of the amplitude absolute level follows up the amplitude center of the uppermost eye.

Figure 12:
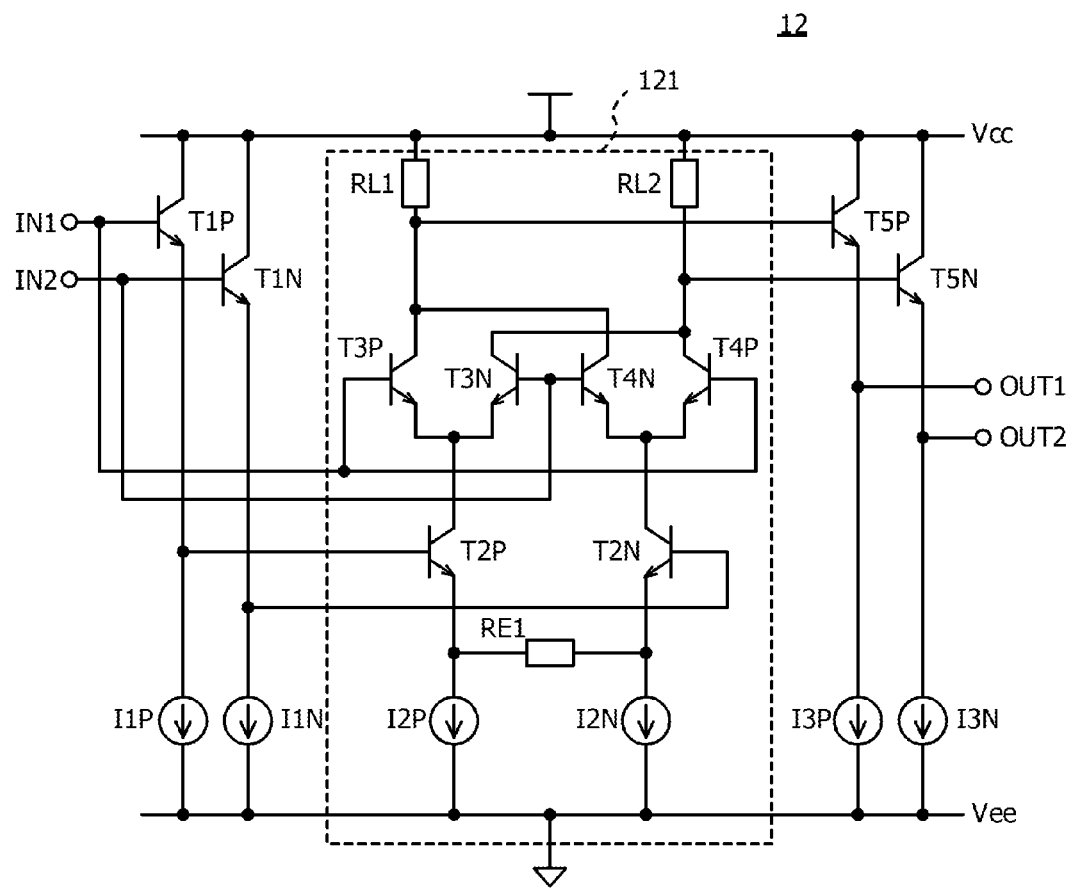
FIG. 12 depicts an example of an absolute level detection circuit.

FIG. 12 depicts an example of an absolute level detection circuit. The absolute level detection circuit depicted in FIG. 12 may correspond to the absolute level detection circuit 12 (or 13) of FIG. 3. Input terminals IN1 and IN2 are coupled to a differential output from the buffer amplifier 11. The absolute level detection circuit 12 includes a multiplication circuit 121. The multiplication circuit 121 has a function of multiplying inputs to transistors T2P and T2N and inputs to transistors T3P and T3N and transistors T4P and T4N, and performs absolute level detection by squaring when equivalent signals are input to the transistors.

When the signal appearing at the input terminal IN1 is "H," an npn transistor T1P turns on and current is applied to the base of the transistor T2P of the multiplication circuit 121 and the transistor T3P turns on. Consequently, current to a load resistor RL1 increases and the negative-phase output of the multiplication circuit 121 outputs "L."

When the signal appearing at the input terminal IN2 is "H," a npn transistor T1N turns on and current is applied to the base of the transistor T2N of the multiplication circuit 121 and the transistor T4N turns on. Consequently, current to the load resistor RL1 increases and the negative-phase output of the multiplication circuit 121 outputs "L."

The negative-phase output of the multiplication circuit 121 by conduction of the transistors T3P and T2P and conduction of the transistors T4N and T2N is applied to the base of a transistor T5P and is taken out as an output OUT1 appearing at the emitter side of the transistor T5P.

The transistor T4P of the multiplication circuit 121 is turned on by a signal "H" appearing at the input terminal IN1. At this time, since the transistor T2N is in an off state by an input of an "L" signal from the input terminal IN2, the current to a load resistor RL2 decreases, and the positive-phase output of the multiplication circuit 121 outputs "H." Similarly, the transistor T3N of the multiplication circuit 121 is turned on by a signal "H" appearing at the input terminal IN2. At this time, since the transistor T2P is in an off state by an input of an "L" signal from the input terminal IN1, the current to the load resistor RL2 decreases and the positive-phase output of the multiplication circuit 121 outputs "H."

The positive-phase output of the multiplication circuit 121 by conduction of the transistors T4P and T2N and conduction of the transistors T3N and T2P is applied to the base of a transistor T5N and is taken out as an output OUT2 that appears at the emitter side of the transistor T5N. The output OUT2 has an inverted waveform to an waveform of the output OUT1. An analog output of the absolute level detection circuit 12 is a differential voltage between the outputs OUT1 and OUT2, and a voltage obtained by averaging the differential voltage by a low-pass filter or the like may correspond to the average of the amplitude absolute level.

Figure 13:
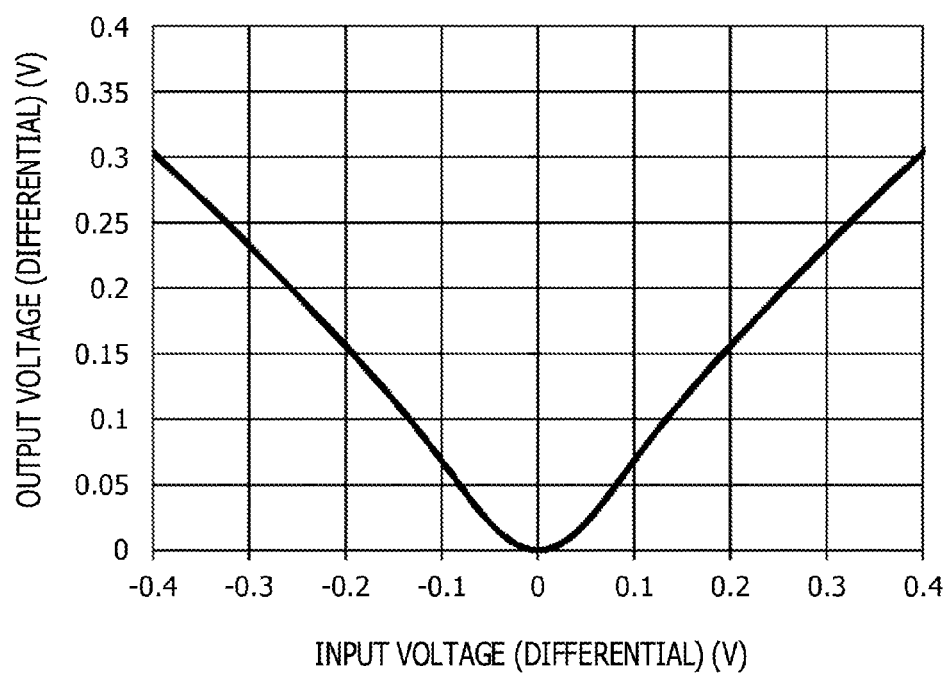
FIG. 13 depicts an example of a response characteristic of an absolute level detection circuit.

FIG. 13 depicts an example of a response characteristic of an absolute level detection circuit. The absolute level detection circuit of the response characteristic depicted in FIG. 13 may be the absolute level detection circuit 12 of FIG. 12. The axis of abscissa indicates the input differential voltage (V) and the axis of ordinate indicates the output differential voltage (V). Although the output differential voltage (response) with respect to the input differential voltage becomes dull a little in the proximity of zero, it has a response characteristic good over a wide range.

Figure 14:
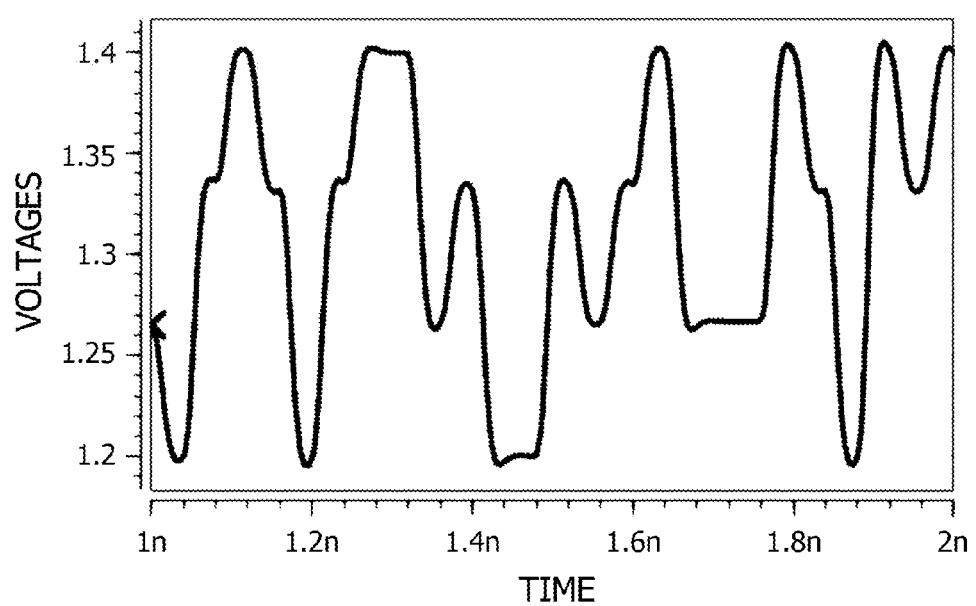
FIG. 14 depicts an example of a waveform of a four-level pulse amplitude modulation signal.

FIG. 14 depicts an example of a four-level pulse amplitude modulation (PAM4) waveform. In FIG. 14, a four-level pulse amplitude modulation (PAM4) waveform where the bandwidth is SR×1.0 is depicted.

Figure 15:
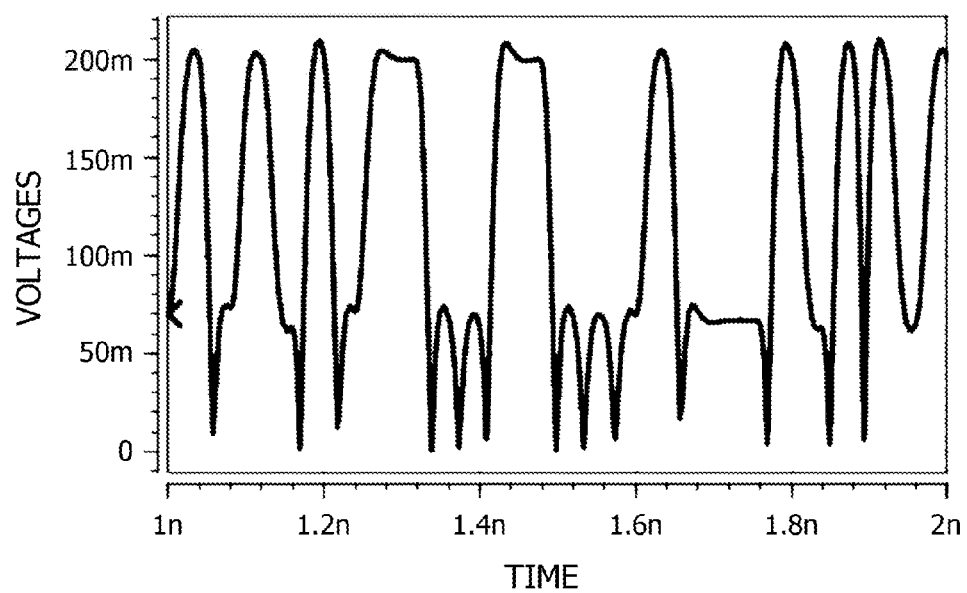
FIG. 15 depicts an example of an ideal waveform of an amplitude absolute level.

FIG. 15 depicts an example of an ideal waveform of an amplitude absolute level. FIG. 15 depicts an ideal absolute level waveform based on the input PAM4 waveform of FIG. 14. If the waveform of FIG. 14 is folded back with respect to the average level of the amplitude of FIG. 14, for example, with respect to zero, then the waveform of FIG. 15 is obtained.

Figure 16:
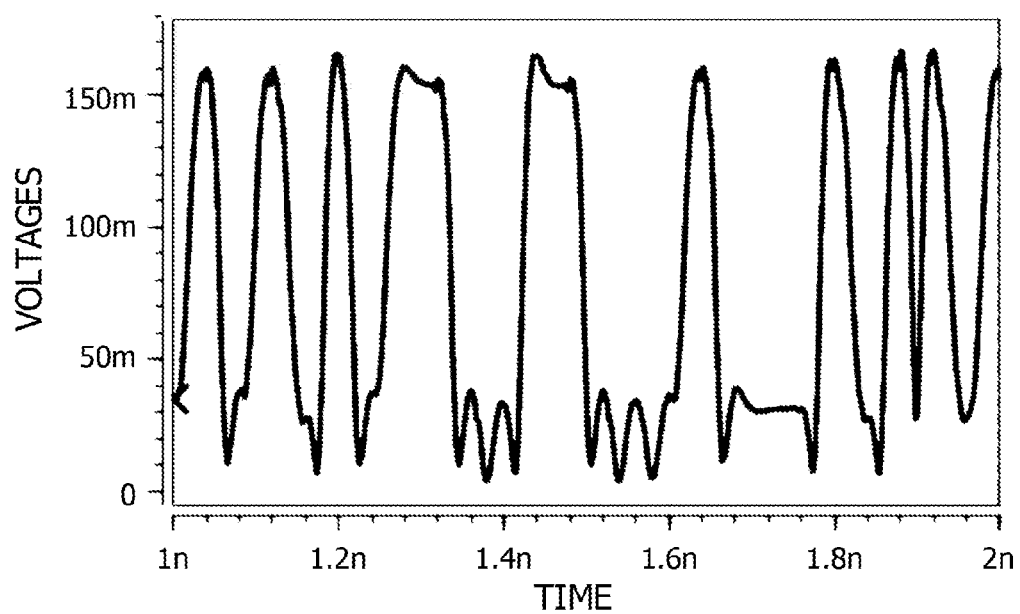
FIG. 16 depicts an example of a waveform of an amplitude absolute level.

FIG. 16 depicts an example of a waveform of an amplitude absolute level. FIG. 16 depicts a waveform of the amplitude absolute level output from the absolute level detection circuit 12 of FIG. 12, for example, a result of a simulation of the absolute level detection circuit 12 of FIG. 12. Although, in comparison with the ideal waveform of FIG. 15, the waveform of FIG. 16 exhibits that high frequency components are dull a little at a low differential voltage level, it indicates a good absolute level waveform. The very small dullness of the waveform corresponds to the dullness of the response waveform in the proximity of 0 V in FIG. 13.

Figure 17:
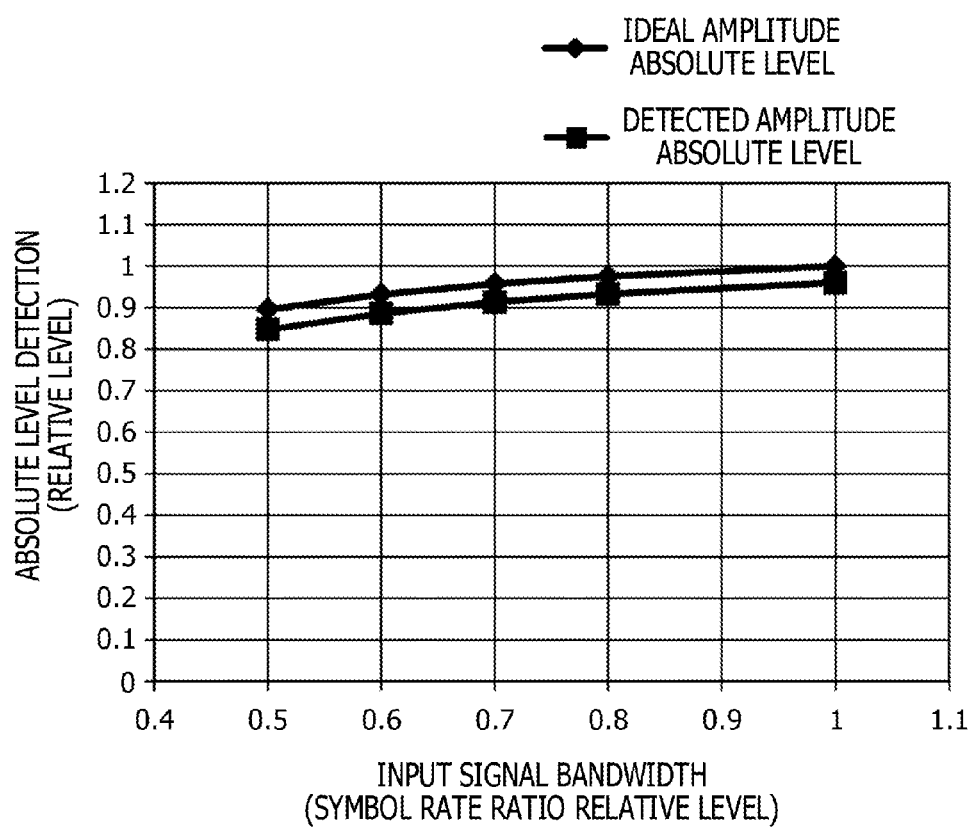
FIG. 17 depicts an example of closeness between an average of an ideal amplitude absolute level and an average of a detected amplitude absolute level.

FIG. 17 depicts an example of closeness between an average of an ideal amplitude absolute level and an average of a detected amplitude absolute level. In FIG. 17, the waveform of the amplitude absolute level output from the absolute level detection circuit 12 of FIG. 12 depicted in FIG. 16 is compared with the ideal absolute level of FIG. 15. In FIG. 17, the detection result by the absolute level detection circuit 12 of FIG. 12 exhibits a tendency substantially same as the tendency of the ideal absolute level irrespective of the variation of the bandwidth of the input signal. As described hereinabove with reference to FIGS. 8 and 11, the average of the amplitude absolute level follows up the variation of the amplitude center of the uppermost eye opening or the lowermost eye opening. Therefore, an optimum threshold level is set by adjusting the average of the amplitude absolute level with a given ratio.

If the threshold level for signal decision is feedforward set automatically in response to the variation of the signal amplitude, the multi-level modulation signal may be identified accurately. The decision accuracy of a multi-level modulation signal may be improved by a simple circuit configuration without using an AGC that uses the high-speed negative feedback or a combination of a DSP and an ADC that involve high power consumption and a large latency.

The amplitude absolute level may be detected by full-wave rectification. Alternatively, the amplitude absolute level may be detected by half-wave rectification. In this case, only positive part of an AC signal is rectified and used. The ratio for adjusting the average of the amplitude absolute level to set a threshold level may be A/B times in the case of full-wave rectification and A/(B/2) times, for example, 2A/B times, in the case of half-wave rectification.

Although an example of four-level amplitude modulation is indicated, the embodiment may be applied also to multi-level modulation such as eight-level amplitude modulation. In the case of the eight-level amplitude modulation, the threshold level setting circuit 14 sets three stages of coefficients $\alpha 1$, $\alpha 2$ and $\alpha 3$ and fixedly multiplies the average of the amplitude absolute level by the coefficients, and three threshold levels on the positive side with respect to zero are set thereby. Similarly, the threshold level setting circuit 15 sets three stages of coefficients $\alpha 4$, $\alpha 5$ and $\alpha 6$ and fixedly multiplies the average of the amplitude absolute level by the coefficients, and three threshold levels on the negative side with respect to zero are set thereby. The average level of the amplitude obtained from the differential output is set around the center of zero. Since the voltage level of an input signal is decided using threshold levels that follow up a signal variation, a signal of 3 bits is identified with high accuracy irrespective of bandwidth degradation or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A signal decision circuit comprising:
    a first decision circuit configured to identify a voltage level of an input signal using an average level of an amplitude of the input signal as a first threshold level;
    a detection circuit configured to detect an average of an amplitude absolute level based on the average level of the amplitude;
    a second decision circuit configured to identify a voltage level of the input signal using a second threshold level obtained by adding the average of the amplitude absolute level to the average level of the amplitude; and
    a third decision circuit configured to identify a voltage level of the input signal using a third threshold level obtained by subtracting the average of the amplitude absolute level from the average level of the amplitude.

2. The signal decision circuit according to claim 1, further comprising:
    a threshold level setting circuit, coupled to an output of the detection circuit, configured to generate the second threshold level or the third threshold level by adjusting the average of the amplitude absolute level with a given ratio.

3. The signal decision circuit according to claim 1, further comprising
    a differential amplifier configured to receive the input signal and output the received input signal as a differential output,
    the differential output being coupled to an input of the detection circuit.

4. The signal decision circuit according to claim 3,
    wherein the detection circuit includes an analog absolute level detection circuit including:
    a first input and a second input coupled to an output of the differential amplifier; and
    a first output and a second output configured to output the average of the amplitude absolute level.

5. The signal decision circuit according to claim 4,
    wherein the detection circuit includes a multiplication circuit.

6. The signal decision circuit according to claim 3,
    wherein the differential output is coupled to an input of the first decision circuit.

7. The signal decision circuit according to claim 1,
    wherein the input signal is an alternating-current signal from which a direct-current component is removed.

8. The signal decision circuit according to claim 1,
    wherein a multi-level amplitude modulation signal is demodulated based on results of an decision of the first decision circuit, the second decision circuit and the third decision circuit.

9. An optical receiver comprising:
    a photoelectric converter configured to convert an optical signal into an electric signal; and
    a signal decision circuit to which the electric signal is input as an input signal,
    wherein the signal decision circuit includes:
    a first decision circuit configured to identify a voltage level of the input signal using an average level of an amplitude of the input signal as a first threshold level;
    a detection circuit configured to detect an average of an amplitude absolute level based on the average level of the amplitude;
    a second decision circuit configured to identify a voltage level of the input signal using a second threshold level obtained by adding the average of the amplitude absolute level to the average level of the amplitude; and
    a third decision circuit configured to identify a voltage level of the input signal using a third threshold level obtained by subtracting the average of the amplitude absolute level from the average level of the amplitude.

10. The optical receiver according to claim 9, further comprising:
    a threshold level setting circuit, coupled to an output of the detection circuit, configured to generate the second threshold level or the third threshold level by adjusting the average of the amplitude absolute level with a given ratio.

11. The optical receiver according to claim 9, wherein the signal decision circuit includes a differential amplifier configured to receive the input signal and output the received input signal as a differential output, the differential output being coupled to an input of the detection circuit.

12. The optical receiver according to claim 11,
wherein the detection circuit includes an analog absolute level detection circuit including:
a first input and a second input coupled to an output of the differential amplifier; and
a first output and a second output configured to output the average of the amplitude absolute level.

13. The optical receiver according to claim 12,
wherein the detection circuit includes a multiplication circuit.

14. The optical receiver according to claim 11,
wherein the differential output is coupled to an input of the first decision circuit.

15. The optical receiver according to claim 9,
wherein the input signal is an alternating-current signal from which a direct-current component is removed.

16. The optical receiver according to claim 9,
wherein a multi-level amplitude modulation signal is demodulated based on results of an decision of the first decision circuit, the second decision circuit and the third decision circuit.

17. A signal decision method comprising:
receiving an input signal by a differential amplifier;
outputting a differential output as an average level of an amplitude of the input signal;
setting the average level of the amplitude of the input signal as a first threshold level;
detecting an average of an amplitude absolute level based on the average level of the amplitude;
setting a level obtained by adding the average of the amplitude absolute level to the average level of the amplitude as a second threshold level;
setting a level obtained by subtracting the average of the amplitude absolute level from the average level of the amplitude as a third threshold level; and
identifying a multi-level amplitude modulation signal using the first threshold level, the second threshold level and the third threshold level.

18. The signal decision method according to claim 17, further comprising:
generating the second threshold level and the third threshold level by adjusting the average of the amplitude absolute level with a given ratio.

19. The signal decision method according to claim 18, further comprising:
determining a correlation coefficient using an amplitude center of an uppermost or lowermost eye opening of the multi-level amplitude modulation signal and the amplitude absolute level as a function of a bandwidth; and
determining the given ratio from the correlation coefficient.

20. The signal decision method according to claim 17, further comprising:
receiving an optical signal; and
generating the input signal by removing a direct-current component from the optical signal.

* * * * *